July 17, 1962

A. VOGELIN 3,044,520

TIRE CHAINS

Filed May 29, 1961

INVENTOR.
ALBERT VOGELIN

July 17, 1962 — A. VOGELIN — 3,044,520
TIRE CHAINS
Filed May 29, 1961 — 2 Sheets-Sheet 2
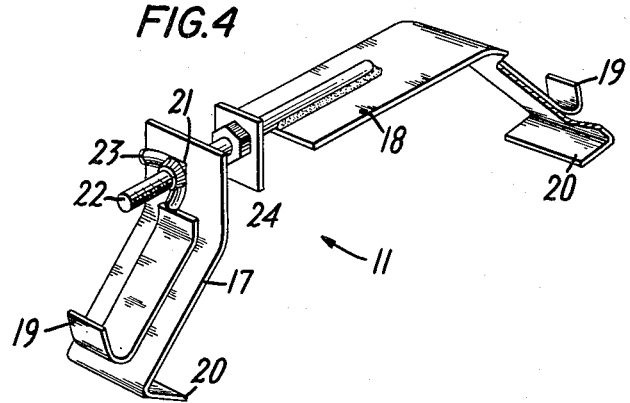
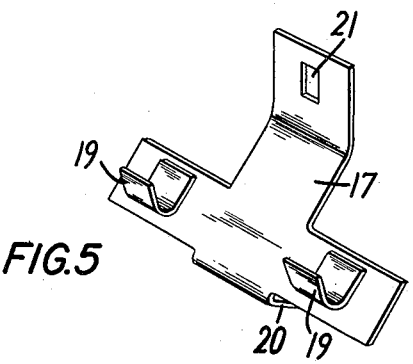
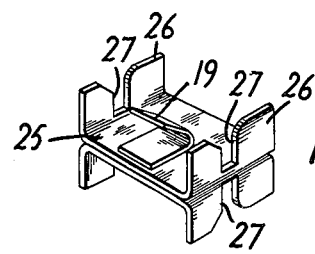
INVENTOR.
ALBERT VOGELIN United States Patent Office 3,044,520
Patented July 17, 1962

3,044,520
TIRE CHAINS
Albert Vogelin, 561 Hudson St., New York, N.Y.
Filed May 29, 1961, Ser. No. 113,227
6 Claims. (Cl. 152—237)

This invention relates to automobile anti-skid and traction devices, the primary object being to provide an inexpensive tire chain to enable its use by the many that cannot afford the expense of the conventional chains.

The invention further provides for a replaceable chain element that can be reversed and worn on both sides of the chain link and that upon breaking from wear will instantly disengage from its anchor thus eliminating the noise that occurs as when broken chains strike the mud guards.

A principal object and feature of the invention provides positive means to conveniently and quickly attach or detach the chain element.

Another important feature of the invention permits of the use of chain links less than half the size and weight of the conventional type resulting in less thumping as the wheel rotates in motion providing a smoother ride.

Still another object of the invention provides by the use of smaller chain links and the tightening of the chain element to the tire tread, greater chain life since the slapping of the chain against the road surface is substantially eliminated. Likewise, damage to the roadway is diminished.

Other features and advantages of the invention will become manifest by making reference to the detailed description and drawings.

FIG. 4 is a face view of the anchoring assembly element of the invention.

FIG. 5 is a face view of the front section of a dual anchoring assembly element of the invention.

FIG. 6 is a face view of a plate link connector formed with a lug to engage the slot of the anchor element.

Figure 1:
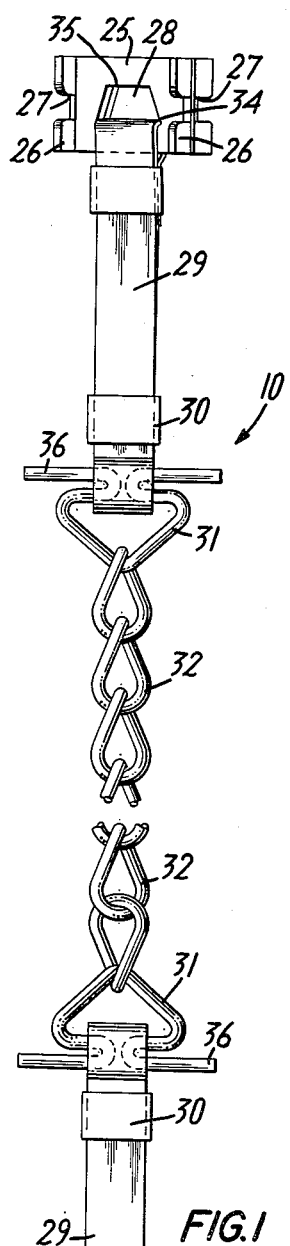
FIG. 1 is a perspective view of the detachable and reversible chain element of the invention.
Figure 2:
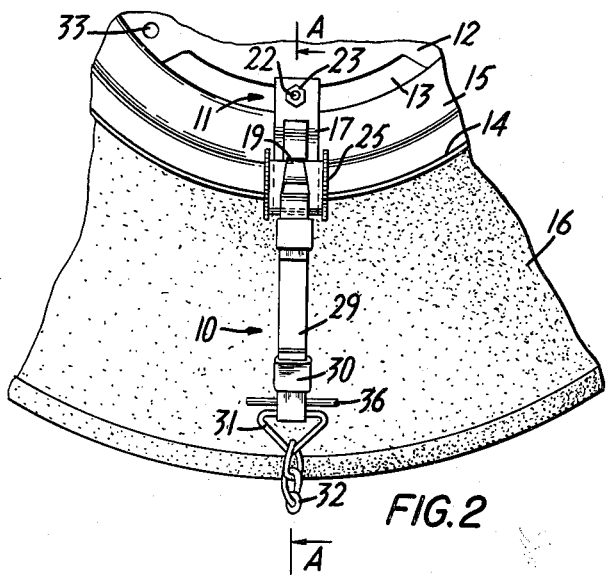
FIG. 2 is a side elevational view of a portion of an automobile wheel and tire on which the anchor assembly is shown thereon in accordance with the form of the invention.

Referring to the drawings it must be noted that the invention has two separate elements. The chain structure 10 as indicated in FIG. 1 and the anchoring means 11 for the chain element 10 shown in FIG. 4. As will be readily apparent the anchoring element 11 consists of a front section 17 and a rear section 18 to which a suitable metal bolt 22 has been attached and provided to connect the front anchor section 17 through its slotted opening 21 to the rear anchor section 18. To the opposite ends of both anchor sections 17—18 flanges 20 are formed to engage around the edge 14 of the wheel rim 15 so that when the rear anchor section 18 is inserted through the wheel aperture 13 and the front anchor section 17 is attached to the bolt 22 by means of the wing nut 23, the both anchor sections 17—18 are securely held in position by being bolted and clamped against both edges 14 of the wheel rim 15 as shown in FIGURE 3.

Figure 3:
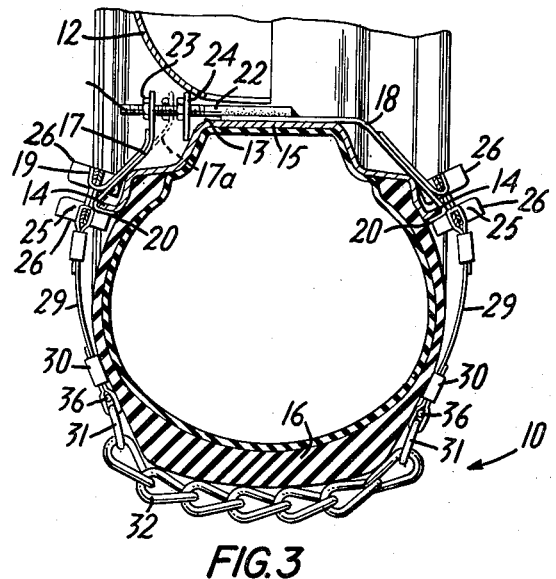
FIG. 3 is a fragmentary cross sectional view of the anchor assembly taken on line A—A of FIGURE 2.

It must be noted that the rear section of the anchor assembly 18 can be independently secured to the rim 15 and the wall of the wheel 12 by use of the nut and the eccentric washer 24 formed to level any irregularity of space between the rim body 15 and the wall body 12 to facilitate the attaching of the chain element 10 or it may be secured by the use of a front anchor section 17A from which the lug 19 has been removed as shown in FIGURE 3.

With the rear anchor section 18 bolted in position it is now but necessary in mounting the chain element 10 to place any plate link 25 on the lug 19 of the rear anchor section 18 and with both hands being free to engage the other plate link 25 to the lug 19 of the front anchor section 17 which is then positioned to receive the bolt 22, applying and tightening the wing nut 23 draws the front anchor section 17 to the rim edge 14, the bolting pressure forcing the lugs 26 of the plate link 25 into position about the rim edge 14 the chain element stretching rigidly around the tire.

This construction supports the chain element 10 securely in position against the rim edge 14 of the wheel and is not affected by the great side pull that occurs as when the chain engages the pavement as in skidding.

Referring now to the anchoring sections 17—18 as shown in FIG. 4 it is to be noted that they are formed to the general contour of the wheel rim 15 on which they lean and receive support and are formed of steel bar having pierced lugs 19 to which the chain element 10 attaches. It must be noted that the lugs 19 are of themselves not sufficiently strong to withstand the great strain to which they are subjected and they only partially support the chain element 10 while they provide means to hold in position the plate links 25 of the chain element 10 that become rigidly locked to the edges 14 of the rim 15, with a snap action due to the bolting pressure. When secured to the edge of the rim 15 and being additionally supported and held in position by the lugs 19, the plate links 25 of the chain element 10 have added strength and cannot be moved. However it is obvious that should the chain 32 break as from wear then the both severed parts of the chain element 10 would drop away from anchorage.

As shown in the drawing of FIG. 1 the chain element 10 is a flexible, detachable and reversible unit comprising two metal plates links 25, a short length of chain 32, two metal link connectors 31, two lengths of steel strap 29 and four strap seals 30 provided to secure the parts of the chain element together. It will be noted that the construction of the chain element is such that it can be attached to the lugs 19 in any direction, the plate link 25 being identical on both sides allows for the reversing of the chain element when one surface of the chain becomes worn.

The plate link 25 is a metal stamping having a pierced opening 28 through which the strap 29 attaches to the inside edge 34, the opposite edge 35 engaging the lug 19 of the anchor. As shown the plate link 25 is flanged and lugs 26 are formed thereon to coincide with the contour of both surfaces of the edge 14 of the rim 15, to which it attaches through the cutout 27. Two plate links 25 being secured back to back as by welding and being identically formed enable the chain element 10 to be reversible.

The metal link connectors 31 connecting the chain 32 to the strap 29 are triangular in shape and formed with a base 36 extending beyond the strap seat portion and defines a stabilizing bar provided to prevent the rolling or twisting of the chain 32 and to keep it positioned.

Referring now to FIG. 5 wherein is shown the dual formation of the invention, the front anchor section 17 is formed to provide a plurality of engaging means whether lugs or slots and provided to maintain the chain elements 10 in parallel spaced relationship. Rear anchor sections 18 likewise formed to engage a plurality of chain elements 10 may be mounted as easily as the single assembly.

It will be apparent to those versed in the art that the device as described herein must be custom built to cope with the many types and sizes of the wheel rims to which this invention applies and that obviously modifications too many to mention must occur. In this connection and among some of the variations, it is found that at times it is preferable to have the lugs 19 placed on the plate link 25 as shown in FIG. 6 and the slot 28 to engage the lug 19 pierced in the anchor sections 17—18, the lug resting on the top edge 14 of the rim 15. Likewise the lugs may be welded to the anchor sections for greater strength. Also it must be noted that where possible the front anchor section 17 is deeply slotted to allow its movement away from the rim 15 sufficiently to permit the removal of the chain element 10 while the wing nut 23 is still loosely engaged to the bolt 22. Various bolting means are provided to meet different situations. The metal strap 29 may be of a hinged wire construction and yet may be spot welded, eliminating the seals 30. Still it is found necessary when employing the device to a wheel devoid of an opening between the rim 15 and the wheel wall 12 to effect one by drilling a small opening 33 sufficient to allow the passing of the bolt 22 of the rear anchor section 18. Therefore it is evident numerous changes may be made in the construction, form and arrangement of the several parts of both the elements of the device without departing from the scope of my invention and hence I do not intend to be limited to the particular embodiment herein shown and described.

I claim:

1. In combination with a wheel rim having a tire mounted thereon, a tire chain assembly comprising an anchor element and a tire chain element;
    said anchor element comprising a front section and a rear section;
    said sections being joined by connecting means; the radially outer end of said front section and the radially outer end of said rear section terminating in axially inwardly extending flanges normal to the direction of the anchor element and engaging the wheel rim;
    said front and rear sections conforming to the general contour of the wheel rim and forming a clamp engaging the edges of the wheel rim with said end flanges; and
    said anchor element having coupling means at the ends thereof engaging said tire chain element;
    said tire chain element comprising a tire chain connected to terminal plate links,
    said plate links having a flange along each edge parallel to the direction of the chain, each of said flanges having notches engaging the edge of said wheel rim; and
    said plate links having cooperating coupling means engaging said anchor element.

2. In combination with a wheel rim having a tire mounted thereon according to claim 1 in which the rear section of the anchor element contains a means for independently securing it to the wheel rim.

3. In combination with a wheel rim having a tire mounted thereon, a tire chain assembly comprising an anchor element and a tire chain element;
    said anchor element comprising a front section and a rear section;
    said sections being joined by connecting means; the radially outer end of said front section and the radially outer end of said rear section terminating in axially inwardly extending flanges normal to the direction of the anchor element and engaging the wheel rim;
    said front and rear sections conforming to the general contour of the wheel rim and forming a clamp engaging the edges of the wheel rim with said end flanges; and
    said anchor element having coupling means at the ends thereof engaging said tire chain element;
    said tire chain element comprising,
    (i) a tire chain connected to,
    (ii) flexible straps at each end, and
    (iii) said straps also being connected to terminal plate links,
    said plate links having a flange along each edge parallel to the direction of the chain, each of said flanges having notches engaging the edge of said wheel rim; and
    said plate links having cooperating coupling means engaging said anchor element.

4. In combination with a wheel rim having a tire mounted thereon according to claim 3 in which the tire chain element contains a stabilizing bar connected at each end of the tire chain.

5. In combination with a wheel rim having a tire mounted thereon according to claim 3 in which said plate links have flanges notched on both faces so that the tire chain assembly is reversible.

6. In combination with a wheel rim having a tire mounted theron, a tire chain assembly comprising an anchor element and a tire chain element;
    said anchor element comprising a front section and a rear section;
    said sections being joined by connecting means; the radially outer end of said front section and the radially outer end of said rear section terminating in axially inwardly extending flanges normal to the direction of the anchor element and engaging the wheel rim;
    said front and rear sections conforming to the general contour of the wheel rim and forming a clamp engaging the edges of the wheel rim with said end flanges; and
    said anchor element having protruding lugs adjacent the ends thereof engaging slots in said tire chain element;
    said tire chain element comprising,
    (i) a tire chain having a stabilizing bar at each end, and
    (ii) flexible metal straps at each end, and
    (iii) said straps also being connected to terminal plate links,
    said plate links having a flange along each edge parallel to the direction of the chain, each of said flanges having notches engaging the edge of said wheel rim; and
    said plate links having slots adjacent the ends thereof engaging said lugs in said anchor element.

References Cited in the file of this patent

UNITED STATES PATENTS

| | | |
|---|---|---|
| 1,618,938 | Marshall | Feb. 22, 1927 |
| 2,101,588 | Lisowitz | Dec. 7, 1937 |
| 2,434,362 | Landes | Jan. 13, 1948 |